May 19, 1925.
C. J. DUNZWEILER
STORAGE BATTERY CONTAINER
Filed Aug. 3, 1923
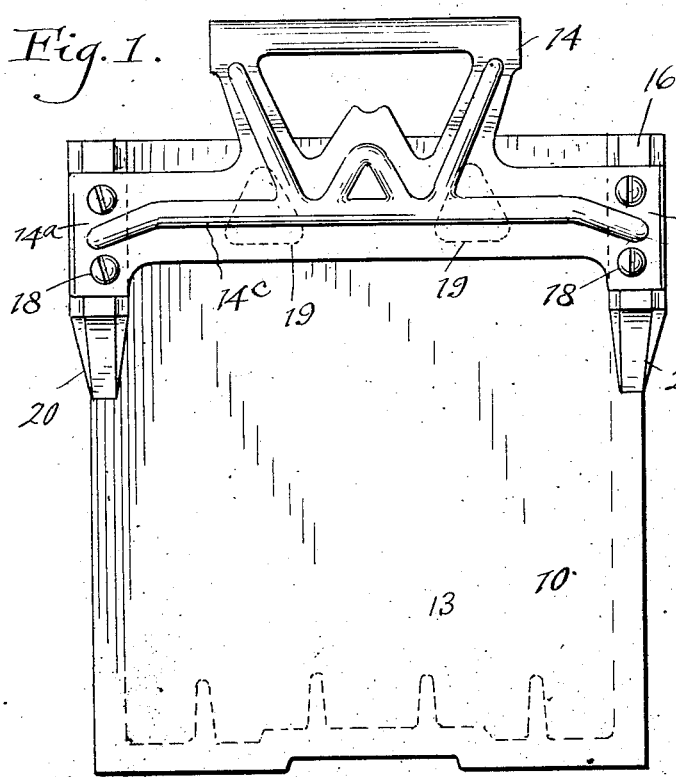
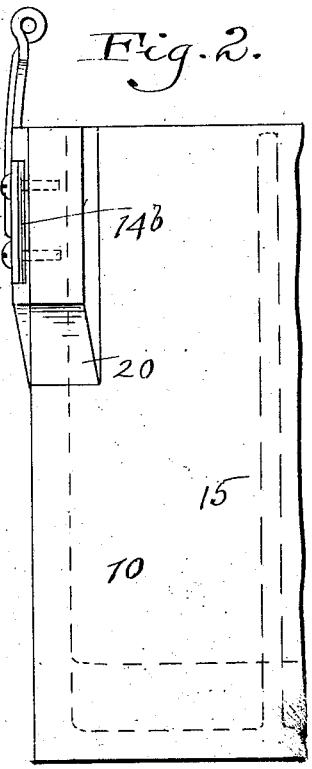
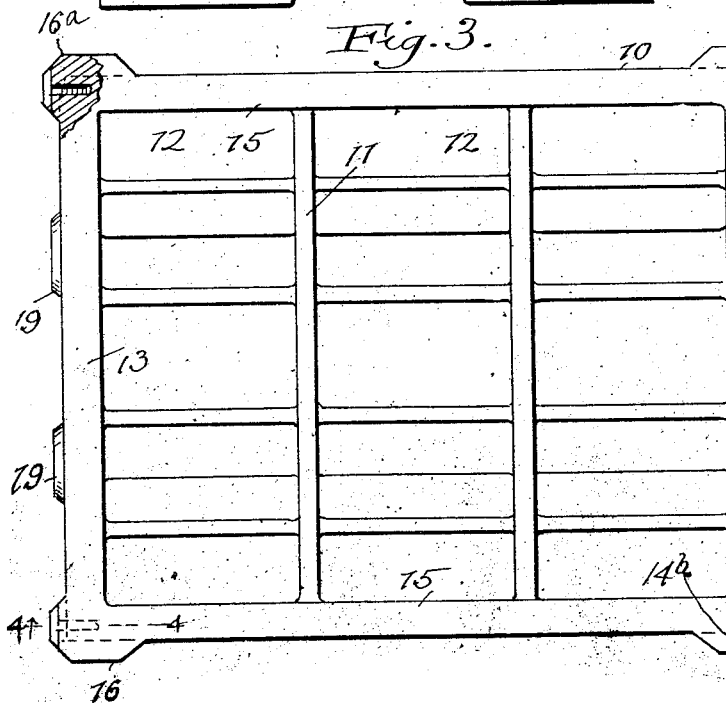
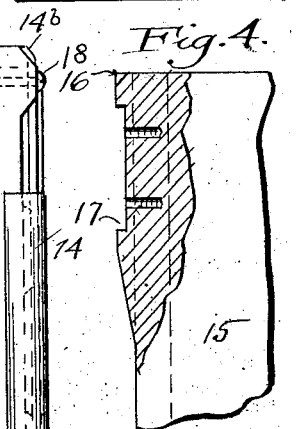
Inventor
Carl J. Dunzweiler
Attorneys Patented May 19, 1925.

1,538,003

UNITED STATES PATENT OFFICE.

ELOI RICARD, OF MELLE, FRANCE, ASSIGNOR TO SOCIÉTÉ RICARD, ALLENET & CIE., DISTILLERIES DES DEUX-SEVRES, OF MELLE, DEUX-SEVRES, FRANCE.

PROCESS FOR PURIFYING LIQUIDS.

No Drawing. Original application filed December 24, 1921, Serial No. 524,763. Divided and this application filed May 26, 1924. Serial No. 716,066.

*To all whom it may concern:*

Be it known that I, ELOI RICARD, a citizen of France, and a resident of Melle, Deux-Sevres Department, France, have invented new and useful Improvements in Processes for Purifying Liquids, which is fully set forth in the following specification, which is a division of my application Serial No. 524,763 filed December 24, 1921, which matured into Patent 1,515,968 Nov. 18, 1924.

The present invention has for its object a process of purifying liquids of various kinds, which consists in adding first a suitable quantity of a soluble alginate to the liquid, then a suitable acid, base or easily incompoundable salt, so as to form a coagulating and clarifying precipitate of alginic acid or an insoluble alginate in the mass of the liquid, which when separated from the liquid constitutes a filter cake having alimentary or fertilizing properties.

This process may be particularly applied to the purification of the saccharine juices or liquid.

It is known that in the ordinary saccharine fabrication, the juice obtained by diffusion, pressure or other means of extraction from the raw material used, is purified for the purpose of removing the greater part of the impurities called generally "non-sugar."

The purification process universally used consists in causing lime and carbon dioxide to act on the juice once or several times at raised temperature.

For example, for the purification of the juice from beetroot the operation is generally as follows:—

To 1 hectolitre of beet juice (extracted by diffusion) heated to about 80° C. there is added milk of lime corresponding with 2–2.5 kilos of CaO. A stream of carbon dioxide is then passed through the mass, in order to saturate a part of the alkali.

As a result of the physical and chemical actions of the substances present, there forms a heavy precipitate. The mass is filtered under a pressure of 2 to 3 kg. per square centimeter, there being obtained, on the one hand, clear juice partially purified and, on the other hand, a residue containing the impurities of the beet mixed with a large quantity of calcium carbonate. This operation constitutes the first carbonatation.

To 1 hectolitre of juice thus obtained there is again added milk of lime corresponding with 0.2–0.4 kilos of CaO. A stream of carbon dioxide is passed through the mass in order to saturate the alkali as exactly as possible and the whole is then heated to boiling. There forms a precipitate, the mass is again filtered, there being obtained, on the one hand, clear juice more nearly purified and, on the other hand, a residue containing for the greater part calcium carbonate. This operation constitutes the second carbonatation.

The second carbonatation is sometimes followed by a third, effected under the same conditions.

By starting with a juice of 88° of purity (88 per cent of sugar in the dry extract) there is obtained an approximate purity of 92° to 92.5°.

By the present invention saccharine juices or liquids are purified more simply and more completely by adding to the juice or liquid to be purified a suitable quantity of a soluble alginate, thus producing in the juice, at any suitable temperature (15° to 80° C.), a small quantity of insoluble alginic acid or alginate forming a coagulating and clarifying agent of considerable efficacy.

Alginic acid is one of the constituents of a large number of seaweeds, from which it has been extracted industrially for some years in the form of a soluble alginate (of soda, potash, ammonia, etc.). These alginates dissolve to form a "hydrosol." When this hydrosol is treated with an acid, there is produced insoluble alginic acid, when it is treated with lime there is formed insoluble calcium alginate.

The following examples illustrate the invention:—

*First example.*—To 1 hectolitre of beet juice extracted by diffusion there is added a quantity of hydrosol corresponding to 100 to 150 grams of pure alginate. The mass is stirred for some minutes to make it homogeneous. 200–250 grams of CaO in the form of milk of lime are then added and the mixture is thoroughly agitated and left at rest for 20 to 25 minutes. There forms a coagulum rich in alginate of lime which includes and precipitates the greater part of the impurities. The mass is filtered under slight pressure (0.5–1 kilo) and there is obtained, on the one hand, a highly purified and clarified juice, and on the other hand, a cake composed in the main of the organic substances of the beet.

The juice obtained in this manner being slightly alkaline, is then neutralized by a stream of carbon dioxide.

If the original juice be of 88° of purity, there may be obtained by this treatment a juice of 93–94° purity, approximately. Filtration is more rapid than in the usual carbonatation purification. The reduction in the time of filtration varies from 20 to 50 per cent, according to the juice treated.

The process may be applied to the purification of liquids of various kinds, as illustrated by the following examples.

*Second example.*—To one hectolitre of tannin extract there is added a solution of an alginate containing 300 grams of pure alginate; the mixture is well stirred and there are added 50 grams of barium formate; thorough stirring then follows and the mixture is left at rest for some minutes. There is formed a precipitate of barium alginate which entrains the colloidal matters and the suspensoids contained in the extract.

The mass is filtered by any suitable means and there is obtained on the one hand an absolutely clear liquid, thoroughly purified and decolorized, which may be evaporated without becoming turbid and without deposit on the evaporator, and on the other hand a filter cake having a certain value as a manure.

The purification is the more complete the lower the temperature of the operation.

*Third example.*—To 1 hectolitre of washing water flowing from the strainer of the potato-starch factory there is added a solution of an alginate containing 200 grams of pure alginate; the mixture is well stirred and there are added 150 grams of lime (CaO) in the form of milk of lime, the mixture is thoroughly agitated and then left at rest for some minutes. There is formed a precipitate of calcium alginate which entrains the colloidal matters in the washing water, as well as the light starch in suspension. The whole is filtered by suitable means and there is obtained on the one hand purified and clarified water, no longer liable to putrefaction, and on the other hand a filter cake of high alimentary value.

In certain cases the liquids to be purified contain in solution, among the impurities to be eliminated, acids, bases or inorganic or organic salts capable of forming with the soluble alginate used an insoluble precipitate of alginic acid or alginate having a coagulating effect.

These combinations or double decompositions constitute a chemical purification of a character different from that which precedes.

*Fourth example.*—To 1 hecolitre of wine brandy soiled by contact with an iron receptacle and having acquired an opalescent tinge and a disagreeable taste, there is added a solution of a soluble alginate corresponding with 70 grams of pure alginate; the mixture is well stirred and allowed to rest for some minutes. There is formed a precipitate of iron alginate which is filtered in order to obtain a perfectly clear liquid.

If the filtered liquid contains a small quantity of soluble alginate, there is added a corresponding quantity of lime (30–50 grams) and the mixture is thoroughly agitated. Insoluble calcium alginate is formed and is filtered in order to obtain a brandy absolutely clear and completely regenerated.

The foregoing examples do not limit the invention, since the present process may be applied with suitable variations to various liquids.

What I claim is:

1. A process of purifying liquids of various kinds which consists in adding a water soluble alginate to the liquid, and means to precipitate an insoluble alginate so as to form a precipitate in the mass of the liquid.

2. A process of purifying liquids of various kinds which consists in adding water soluble alginate to the liquid, and means to precipitate an insoluble alginate so as to form a coagulating and clarifying precipitate in the mass of the liquid.

3. A process for purifying liquids consisting in adding a water soluble alginate to the mass to be purified then adding a reagent forming an insoluble salt with alginic acid in order to form a coagulating and clarifying precipitate of an insoluble alginate in the mass to be purified.

4. A process for purifying saccharine juice consisting in adding a water soluble alginate to the mass to be purified then adding a base forming an insoluble salt with alginic acid in order to form a coagulating and clarifying precipitate of an insoluble alginate in the mass to be purified.

5. In a process of purifying liquids of various kinds which consists in adding a water soluble alginate to the liquid and then adding lime to precipitate an insoluble alginate so as to form a coagulating and clarifying precipitate, the separation from the liquid of this precipitate in order to obtain a filter cake having alimentary or fertilizing properties.

In testimony whereof I have signed this specification.

ELOI RICARD.